(12) United States Patent
Li

(10) Patent No.: US 7,785,440 B2
(45) Date of Patent: *Aug. 31, 2010

(54) FORMALDEHYDE-FREE LIGNOCELLULOSIC ADHESIVES AND COMPOSITES MADE FROM THE ADHESIVES

(75) Inventor: Kaichang Li, Corvallis, OR (US)

(73) Assignee: State of Oregon Acting by and through the Oregon State Board of Higher Education on behalf of Oregon State University, Corvallis, OR (US)

( * ) Notice: Subject to any disclaimer, the term of this patent is extended or adjusted under 35 U.S.C. 154(b) by 319 days.

This patent is subject to a terminal disclaimer.

(21) Appl. No.: 11/210,405

(22) Filed: Aug. 23, 2005

(65) Prior Publication Data

US 2005/0282988 A1 Dec. 22, 2005

Related U.S. Application Data

(62) Division of application No. 10/438,147, filed on May 13, 2003, now Pat. No. 7,252,735.

(60) Provisional application No. 60/381,591, filed on May 13, 2002.

(51) Int. Cl.
C09J 163/08 (2006.01)
C08L 97/02 (2006.01)

(52) U.S. Cl. .................. 156/330; 106/126.2
(58) Field of Classification Search ............ None
See application file for complete search history.

(56) References Cited

U.S. PATENT DOCUMENTS

| | | | |
|---|---|---|---|
| 2,882,250 A | 4/1959 | Baker | |
| 2,926,116 A | 2/1960 | Keim | |
| 2,926,154 A | 2/1960 | Keim | |
| 3,149,085 A | 9/1964 | Ball et al. | |
| 3,207,613 A | 9/1965 | Merrill | |
| 3,274,042 A | 9/1966 | Gilboe et al. | |
| 3,285,801 A | 11/1966 | Sarjeant et al. | |
| 3,395,033 A | 7/1968 | Remer | |
| 3,494,775 A | 2/1970 | Coscia et al. | |
| 3,634,399 A | 1/1972 | Coscia et al. | |
| 4,201,851 A | 5/1980 | Chen | |
| 4,382,136 A | 5/1983 | Blount | |
| 4,421,824 A * | 12/1983 | Gupta et al. | 428/211.1 |
| 4,675,351 A | 6/1987 | Brown | |
| 5,017,675 A | 5/1991 | Marten et al. | |
| 5,374,670 A * | 12/1994 | Ayorinde et al. | 524/13 |
| 5,708,059 A | 1/1998 | Pfeil et al. | |
| 6,030,562 A | 2/2000 | Lehtinen et al. | |
| 6,124,032 A | 9/2000 | Bloch et al. | |
| 6,211,357 B1 | 4/2001 | Owens et al. | |
| 6,217,976 B1 | 4/2001 | Macpherson et al. | |
| 6,258,920 B1 | 7/2001 | Starner et al. | |
| 6,277,481 B1 | 8/2001 | Sugino et al. | |
| 6,306,997 B1 | 10/2001 | Kuo et al. | |
| 6,339,116 B1 | 1/2002 | Afzali-Ardakani et al. | |
| 6,368,529 B1 | 4/2002 | Lloyd et al. | |
| 6,395,356 B1 * | 5/2002 | Wielockx et al. | 428/34.8 |
| 6,406,530 B1 | 6/2002 | Bengs et al. | |
| 6,716,421 B2 | 4/2004 | Brode, III et al. | |
| 7,060,798 B2 | 6/2006 | Li et al. | |
| 7,252,735 B2 * | 8/2007 | Li | 156/330 |
| 7,393,930 B2 | 7/2008 | Li et al. | |
| 2001/0014399 A1 | 8/2001 | Jasne | |
| 2002/0005251 A1 | 1/2002 | Sun et al. | |
| 2002/0026025 A1 | 2/2002 | Kuo et al. | |
| 2004/0037906 A1 | 2/2004 | Li et al. | |
| 2004/0089418 A1 | 5/2004 | Li | |
| 2004/0220368 A1 | 11/2004 | Li et al. | |
| 2005/0261404 A1 | 11/2005 | Rivers et al. | |

FOREIGN PATENT DOCUMENTS

BE EP-0878133 A1 * 11/1998

(Continued)

OTHER PUBLICATIONS

Columbia Forest Products, "A Breath of Fresh Thinking PUREBOND™," http://www.columbiaforestproducts.com/products/prodpb/aspx, downloaded Aug. 20, 2006.

(Continued)

Primary Examiner—Andrew D Kosar
Assistant Examiner—Satyanarayana R Gudibande
(74) Attorney, Agent, or Firm—Klarquist Sparkman, LLP

(57) ABSTRACT

Method for making lignocellulosic composites by adhering lignocellulosic substrates together. A first variant of the method involves using an adhesive composition that comprises a reaction product of (i) first ingredient selected from a soy protein or lignin and (ii) at least one substantially formaldehyde-free curing agent that includes at least one amine, amide, imine, imide, or nitrogen-containing heterocyclic functional group that can react with at least one functional group of the soy protein. A second variant of the method involves using an adhesive composition that comprises a reaction product of (i) a protein or lignin, (ii) a first compound that includes at least one amine, amide, imine, imide or nitrogen-containing heterocyclic functional group that can react with at least one functional group of the protein and (iii) a curing agent.

24 Claims, 4 Drawing Sheets

FOREIGN PATENT DOCUMENTS

| | | |
|---|---|---|
| DE | 198 43 493 | 3/2003 |
| EP | 0 199 171 A2 | 7/1986 |
| EP | 0878 133 B1 * | 11/1998 |
| EP | 1 142 482 | 10/2001 |
| EP | 0 969 056 A1 | 1/2002 |
| GB | 1 098 931 | 1/1968 |
| JP | 02-084479 | 3/1990 |
| JP | 2002-150425 | 4/2002 |
| WO | WO 00/08110 | 2/2002 |

OTHER PUBLICATIONS

Columbia Forest Products, "Columbia Forest Products Launches a Revolution in Plywood Adhesives," *Environmental Building News* 14(6):9, 2005.

Evertz, "Bonding with the Industry," http://www.adhesivesmag.com/CDA/Articles/Feature_Article/df86b2419220c010VgnVC, downloaded Jul. 28, 2006.

Hercules Product Data Sheet, "KYMENE® 557H Wet-Strength Resin. Insolubilizing Agent for Water-Soluble Polymers and Gums," 1999.

Hercules Material Safety Data Sheet, "REZOSOL® 9223 Creping Aid," 2003.

Hawley's Condensed Chemical Dictionary (13$^{th}$ ed.), John Wiley & Sons, Inc., p. 964, 1997.

Metafore, "Metafore announces recipients of inaugural Innovations Award," www.metaforce.org, 2006.

RisMedia, "Top Green Building Products of 2006 Selected by Editors of Sustainable Industries Journal," http://rismedia.com/index.php.article/articleview/15478/1/1/, downloaded Aug. 21, 2006.

Office Action dated Nov. 13, 2006, from U.S. Appl. No. 10/438,147, filed May 13, 2003.

Office Action dated Dec. 22, 2006, from U.S. Appl. No. 11/372,998, filed Mar. 9, 2006.

International Search Report dated Nov. 9, 2005 from International Application No. PCT/US2005/001981.

Office action dated Sep. 15, 2005 in U.S. Appl. No. 10/802,500.

Li et al., *Advances in Biodegredation and Biotransformation of Lignocellulosics*, The 225$^{th}$ ACS National Meeting, New Orleans, LA, Mar. 24, 2003.

Li et al., *Composites from Renewable Resources*, The 225$^{th}$ ACS National Meeting, New Orleans, LA, Mar. 26, 2003.

Liu et al., *Macromol. Rapid Commun.* 23(13):739-742, 2002.

Yu et al., *Macromolecules* 31:4739-4745, 1998.

Yu et al., *J. Am. Chem. Soc.* 121:5825-5826, 1999.

DuPont Protein Technologies, Soy Protein Forms, http://www.proteintechnologies.com/corp_eng.nsh/pages/Soy-3, 2002.

Georgia-Pacific Chemical Products, Wet and Dry Strength Resins, http://www.gp.com/chemical/products.asp, 2002.

Hercules Incorporated, Material Safety Data Sheet, http://msds.plaza.herc.com/msds/00223300.html.

Hercules Incorporated, Kymene 557H Wet-Strength Resin Product Data Sheet, 1999.

PCT/US2004/012307 International Search Report dated Dec. 29, 2004.

Brown, "Better Bonding with Beans," *Environmental Health Perspectives* 113(8):A538-A541, 2005.

Georgia-Pacific Resins, Inc. Product Data Sheet, "Paper Chemicals. The Entire spectrum of Performance Paper Chemicals from Georgia Pacific," 1998.

Hampel et al., *Glossary of Chemical Terms* (2d ed.), Van Nostrand Reinhold Company, p. 254, 1982.

Lewis, *Hawley's Condensed Chemical Dictionary* (13$^{th}$ ed.), John Wiley & Sons, Inc., p. 1037, 1997.

http://www.admworld.com/naem/productdb/detao;s.aspx?productID=852, downloaded Jul. 10, 2008.

http://dietandfitnesstoday.com/calories-nutrition-facts.php?id=16175, downloaded Jul. 10, 2008.

http://www.nal.usda.gov/fnic/foodcomp/cgi-bin/list_nut_edit.pl, downloaded Jul. 10, 2008.

Office action dated Jan. 29, 2010, from U.S. Appl. No. 11/800,883.

* cited by examiner

FORMALDEHYDE-FREE LIGNOCELLULOSIC ADHESIVES AND COMPOSITES MADE FROM THE ADHESIVES

PRIORITY CLAIM

This application is a divisional of U.S. application Ser. No. 10/438,147, filed May 13, 2003, now issued as U.S. Pat. No. 7,252,735, which claims the benefit of U.S. Provisional Application No. 60/381,591, filed May 13, 2002, both of which are incorporated herein by reference.

STATEMENT OF GOVERNMENT SUPPORT

This invention was made with United States Government support under Contract USDA/CSREES 2002-34125-10625 awarded by the United States Department of Agriculture. The United States Government has certain rights in the invention.

FIELD

The present disclosure relates to adhesives for making lignocellulosic composites.

BACKGROUND

Lignocellulosic-based composites are formed from small dimension pieces of cellulosic material that are bonded with an adhesive (i.e., a binder). In general, solid wood is fragmented into smaller pieces such as strands, fibers, and chips. An adhesive composition then is added to the wood component. The resulting mixture is subjected to heat and pressure resulting in a composite. The adhesive mix typically is the only non-lignocellulosic component.

The most commonly used wood adhesives are phenol-formaldehyde resins (PF) and urea-formaldehyde resins (UF). There are at least two concerns with PF and UF resins. First, volatile organic compounds (VOC) are generated during the manufacture and use of lignocellulosic-based composites. An increasing concern about the effect of emissive VOC, especially formaldehyde, on human health has prompted a need for more environmentally acceptable adhesives. Second, PF and UF resins are made from petroleum-derived products. The reserves of petroleum are naturally limited. The wood composite industry would greatly benefit from the development of formaldehyde-free adhesives made from renewable natural resources.

Soy protein was used as a wood adhesive for the production of plywood from the 1930's to the 1960's. Petroleum-derived adhesives replaced soy protein adhesives due to the relatively low bonding strength and water resistance of soy protein adhesives. However, soy protein is an inexpensive, abundant, renewable material that is environmentally acceptable.

SUMMARY OF THE DISCLOSURE

Disclosed herein are methods for making lignocellulosic composites by adhering lignocellulosic substrates together. A first variant of the method involves using an adhesive composition that comprises a reaction product of (i) a first ingredient selected from a soy protein or a lignin and (ii) at least one substantially formaldehyde-free curing agent that includes at least one amine, amide, imine, imide, or nitrogen-containing heterocyclic functional group that can react with at least one functional group of the soy protein or lignin. Adducts of epoxides with polyamine, polyamidoamine, or polyamide resins are specific examples of substantially formaldehyde-free curing agents. A second variant of the method involves using an adhesive composition that comprises a reaction product of (i) a protein or lignin, (ii) a first compound that includes at least one amine, amide, imine, or imide functional group that can react with at least one functional group of the protein and (iii) a curing agent.

BRIEF DESCRIPTION OF THE DRAWINGS

Certain embodiments will be described in more detail with reference to the following drawing.

DETAILED DESCRIPTION OF SEVERAL EMBODIMENTS

Figure 1:
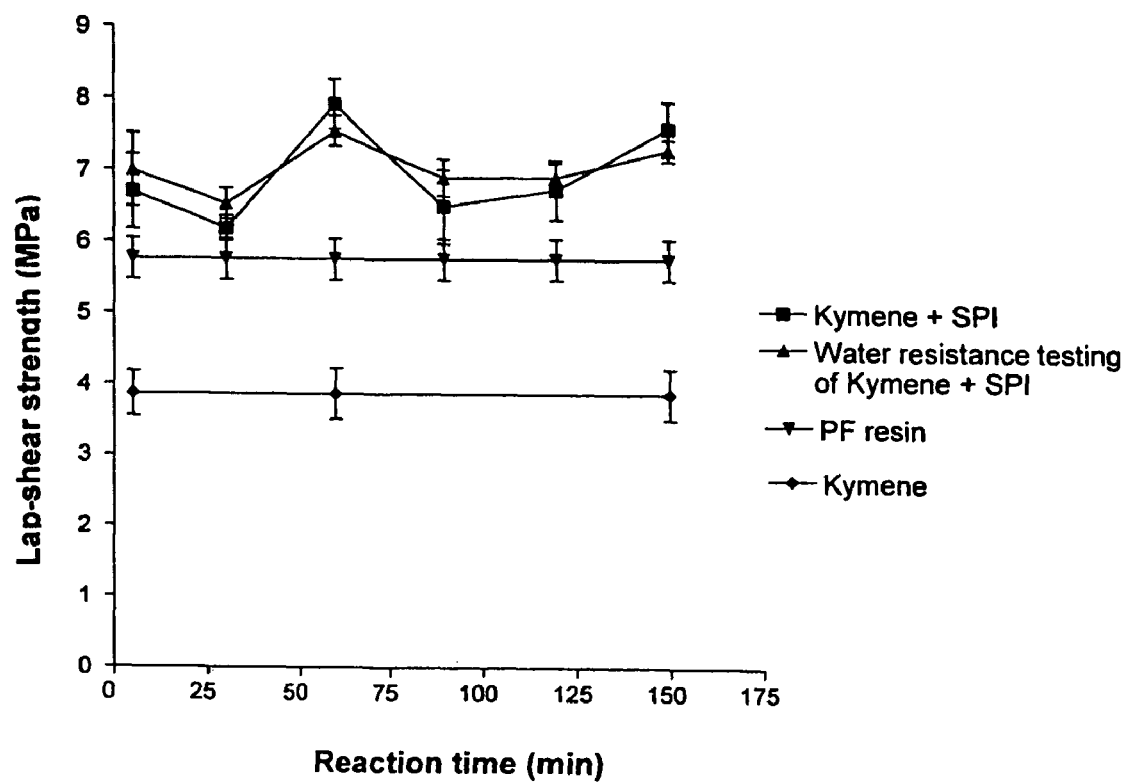
FIG. 1 is a graph depicting the lap-shear strengths of examples of the presently described adhesive compositions and prior art adhesive compositions.

For ease of understanding, the following term used herein is described below in more detail:

"Lignin" generally refers to a group of phenolic polymers that confer strength and rigidity to plant material. Lignins are very complex polymers with many random couplings, and thus tend to be referred to in more generic terms. Lignins may include, for instance, analytical lignin preparations such as Brauns lignin, cellulolytic enzyme lignin, dioxane acidolysis lignin, milled wood lignin, Klason lignin, and periodate lignin, and industrial lignin preparations such as kraft lignin and lignosulfonates.

The above term description is provided solely to aid the reader, and should not be construed to have a scope less than that understood by a person of ordinary skill in the art or as limiting the scope of the appended claims.

The adhesive composition can be made by reacting at least one protein, especially a soy protein, and/or a lignin with at least one adhesion promoter. A mixture of protein and lignin may be employed. In a first variant, the protein or lignin is reacted with a substantially formaldehyde-free compound that may provide both curing for the adhesive composition and adhesion to the lignocellulosic substrate. In other words, the substantially formaldehyde-free compound is a difunctional adhesion promoter in the sense that one compound can provide dual functions. In a second variant, the protein or lignin is reacted with two different adhesion promoters. The first adhesion promoter modifies the protein or lignin by introducing additional nitrogen-containing functional groups at internal, terminal and/or pendant positions of the protein or lignin polymer structure resulting in an amino and/or imino-augmented protein. The second adhesion promoter is a curing agent. Both the first and second variants of the adhesive composition typically are provided as a two-part system in which the protein or lignin comprises one part or package and the curing agent (i.e., the difunctional adhesion promoter in the first variant or the distinct curing agent in the second variant) comprises the second part or package. In both the first and second variants, all the parts or components of the composition may be in the form of aqueous solutions or dispersions. Thus, volatile organic solvents as carrier fluids can be avoided. These two variants are described in more detail below.

The protein typically is any protein that is readily available from a renewable source. Examples of such proteins include soy protein, keratin, gelatin, collagen, gluten, and casein. The protein may have been pretreated to obtain a material that is soluble or dispersible in water as is known in the art.

Soy protein is an exemplary protein for use in the presently described adhesives. Soybeans contain about 38 weight percent protein with the remaining portion comprising carbohydrates, oils and moisture. Soybeans are processed to increase the amount of soy protein in the processed product. Soy protein products of any form may be utilized in the disclosed adhesive compositions. The three most common soy protein products are soy flour, soy protein concentrate, and soy protein isolate (SPI). One difference between these products is the amount of soy protein. Soy flour includes approximately 50 weight percent protein, soy protein concentrate includes at least about 65 weight percent protein (dry weight), and SPI includes at least about 85 weight percent protein (dry weight). According to certain embodiments of the adhesive composition, the soy protein is SPI.

As mentioned above, the lignin may comprise an industrial lignin preparation such as kraft lignin. Currently kraft lignin has limited commercial utility, however tons of waste kraft lignin are produced each year as a byproduct of commercial paper production. In particular, kraft lignin typically is produced from woody material in reaction with NaOH and $Na_2S$.

The protein or lignin may be prepared for use in the adhesive compositions in any manner. Typically, the protein or lignin is included in a carrier or delivery liquid such as water or similar solvent. In particular, the protein or lignin may be dissolved in water and the resulting aqueous solution mixed with the adhesion promoter(s). The aqueous adhesive solution may be prepared, for example, by initially mixing the protein or lignin in water and adjusting the pH of the mixture to the desired range. When the protein or lignin is mixed with a difunctional adhesion promoter, the pH of the protein or lignin part should be sufficiently alkaline so that the resulting protein/difunctional adhesion promoter mixture is non-acidic or, more particularly, alkaline. For example, the pH of the protein or lignin part may be about 7 to about 11 resulting in a pH of greater than 6 and up to about 10 for the combined two-part mixture. The pH may be adjusted by adding basic substances such as, for example, alkali metal hydroxides, ammonium hydroxide, amines or pyridine. The amount of protein or lignin dissolved in the water may be adjusted to provide the desired solids content for the protein or lignin part of the two part system. The protein or lignin solids content may be, for example, from about 10 to about 60 weight percent. The protein or lignin solution may be freeze-dried at this stage of formulation or it may remain as a liquid solution. If the protein or lignin solution is freeze-dried, water (or the appropriate carrier fluid) is simply added to the freeze-dried substance prior to use. Freeze-drying reduces the costs of transporting the adhesive. The adhesion promoter(s) is mixed with the aqueous soy protein or lignin solution to form the final adhesive composition that is applied to the wood substrate.

Although not bound by any theory, as mentioned above, it is believed that the molecular structure of the difunctional adhesion promoter includes (1) a reactive site that can cure the adhesive composition and (2) a reactive site that provides adhesion to the lignocellulosic substrate. The cure reactive site and the adhesion reactive site may be located at the same site on the difunctional adhesion promoter. In the other words, a first portion of the available reactive sites on a difunctional adhesion promoter molecule may react with other difunctional adhesion promoter molecules or react with the functional groups (especially carboxylic acid and amino) of the protein. A second portion of the available reactive sites on a difunctional adhesion promoter molecule may form covalent and/or hydrogen bonds with the lignocellulosic substrate.

Examples of suitable difunctional adhesion promoter compounds include adducts of epoxides with polyamine resins, polyamidoamines resins, or polyamide resins. Such resins typically are made from glycidylether or epichlorohydrin condensates of polyalkylene polyamines and are used as wet-strength agents for paper. The resins may be water-soluble or water-dispersible. These resins typically include a nitrogen-containing heterocyclic functional group that is the reactive site for covalently bonding to protein functional groups, covalently bonding to nitrogen-containing heterocyclic functional groups of other resin molecules, and covalently bonding to carboxylic acid and/or hydroxyl groups in the lignocellulosic substrate.

Illustrative commercially-available adducts of epoxides with polyamine resins, polyamidoamines resins, or polyamide resins include Kymene® (resins available from Hercules Inc., Rezosol resins available from Houghton, Cascamid resins available from Borden, and Amres® resins available from Georgia-Pacific Corporation. Kymene® 557H resins are one specific example that is based on the reaction product of poly(adipic acid-co-diethylenetriamine) and epichlorohydrin. Kymene® 557H resins are believed to have a structure that includes a nitrogen-containing, 4-member ring, functional group as shown below:

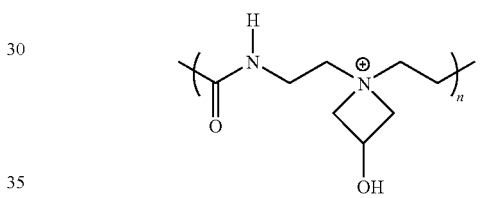

An excess of epichlorohydrin is used to control the rate of crosslinking during the manufacturing process and to aid in storage stability. Such compositions and processes for their manufacture are disclosed, for example, in U.S. Pat. Nos. 2,926,116 and 2,926,154.

Another approach for providing the desired curing and amine, amide, imine, or imide functional groups involves initially modifying the protein or lignin structure so that it includes additional amine, amide, imine, or imide functional groups and subsequently curing the modified protein or lignin. The term "additional" amine, amide, imine, or imide functional groups indicates that the resulting modified protein or lignin structure (i.e., the protein or lignin residue) includes an additional number of covalently bonded amine, amide, imine, or imide functional groups beyond those already existing in the unmodified protein structure. In particular, additional amide, amine, imide and/or imine groups are introduced in internal, terminal and/or pendant positions in the protein or lignin residue structure. The first step includes reacting the protein or lignin with a first compound that can introduce amine, amide, imine, or imide functional groups into the protein or lignin structure. The curing involves reacting the resulting modified protein or lignin with a second compound that can cure the modified protein or lignin. The modified protein or lignin can be provided as the first part of the adhesive system and the second compound (i.e., curing agent) can be provided as the second part of the adhesive system.

The protein- or lignin-modifying step includes reacting the protein or lignin with a nitrogen-donating compound under conditions sufficient for covalently bonding at least one amine, amide, imine, or imide group to the protein or lignin structure. According to illustrative examples, the nitrogen-donating compound reacts with the carboxylic acid, amide and/or hydroxyl groups of the protein or lignin. The reaction conditions may very depending upon the particular protein or lignin and nitrogen-donating compound, but in general the reaction temperature may range from about 4 to about 200° C. The pH may range from about 3 to about 11. Catalysts may include basic substances such as alkali metal hydroxides, ammonium hydroxide, amines, and pyridine and enzymes such as transglutaminases and lipases. The molar reactant ratio of the protein or lignin to the nitrogen-containing compound may range from 1:10 to 1:5000.

Illustrative nitrogen-donating compounds include alkyl amines (e.g., 1,3-diaminopropane, 1,6-hexanediamine, ethylene diamine, diethylenetriamine), unsaturated hydrocarbon amines (e.g., allylamine), hydroxyl amines (e.g., ethanolamine, hydroxylamine), amidines (e.g., melamine), imines (e.g., polyethyleneimine), amino acids (e.g., 4-aminobutyric acid, 6-aminocaprioc acid), polyamines, polyimine, polyamides, and mixtures thereof. The nitrogen-donating compound may be water-soluble or water-dispersible.

As mentioned above, the adhesive composition typically is utilized as a two-part system in which the protein or lignin (either modified or unmodified) comprises one part and the curing agent comprises the second part. The curing agent may be the above-described difunctional adhesion promoter in the first variant or the second compound in the second variant. Illustrative curing agents for the second variant include epoxides (e.g., epichlorohydrin), alkanols (e.g., 1,3-dichloropropan-2-ol), aldehydes (e.g., glyoxal, polymeric dialdehydes such as oxidized starch and dialdehyde starch, and glutaric dialdehyde) and mixtures thereof. The curing agent may be water-soluble or water-dispersible. The two parts are mixed together a short time prior to use. The composition may have an open time of up to about 9 or 10 hours. As used herein, "open time" denotes the time from mixing of the two parts to the time at which the mixed composition cures to a point that it is no longer workable.

The relative amount of protein or lignin mixed with the curing agent may range depending, for example, upon the number of available reactive sites and the molecular weight of the curing agent. For example, the mix ratio of protein or lignin to curing agent may range from about 1:1 to about 1000:1, more particularly from about 1:1 to about 100:1, based on dry weight. In one particular embodiment, the mix ratio of soy protein isolate to difunctional adhesion promoter is about 1:1 to about 1:0.05, based on dry weight. In another particular embodiment, the mix ratio of lignin to difunctional adhesion promoter is about 1:1 to about 5:1, based on dry weight. The protein and the curing agent may be mixed together at standard temperature and pressure (i.e., about 25° C. and about 1 atmosphere). The solids content of the resulting final adhesive mixture may be from about 10 to about 60, more particularly from about 20 to about 60 weight percent. Each (or only one) part of the adhesive system could be provided to the end user in the form of a concentrate that is diluted by the end user to the appropriate mix ratios and solid contents.

The adhesive composition may also include additives and fillers found in lignocellulosic adhesives such as bactericides, insecticides, silica, wheat flour, tree bark flour, nut shell flour and the like.

The adhesive compositions are heat-curable. In other words, heating the two part adhesive mixture forms covalent bonds between the individual molecules of the adhesive composition and covalent and hydrogen bonds between molecules of the adhesive mixture and the lignocellulosic particles. Such curing typically occurs during the hot pressing step of the composite formation. Thus, the cure temperature of the adhesive composition is tailored so that it coincides with the heating temperatures used in composite formation. Such cure temperatures may range, for example, from about 100 to about 200° C., more particularly from about 120 to about 170° C.

Lignocellulosic composites that can be produced with the adhesives described herein include particleboard, oriented strand board (OSB), waferboard, fiberboard (including medium-density and high-density fiberboard), parallel strand lumber (PSL), laminated strand lumber (LSL), and similar products. In general, these composites are made by first blending comminuted lignocellulosic materials with an adhesive that serves as a binder that adheres the comminuted lignocellulosic materials into a unitary densified mass. Examples of suitable lignocellulosic materials include wood, straw (including rice, wheat and barley), flax, hemp and bagasse. The comminuted lignocellulosic materials can be in any processed form such as chips, flakes, fibers, strands, wafers, trim, shavings, sawdust, straw, stalks and shives. The resultant mixture is formed into the desired configuration such as a mat, and then processed, usually under pressure and with heat, into the final product. Processes are generally carried out at temperatures of from about 120 to 225° C. in the presence of varying amounts of steam, generated by liberation of entrained moisture from the lignocellulose materials. Thus, the moisture content of the lignocellulose material may be between about 2 and about 20 percent by weight, before it is blended with the adhesive.

The amount of adhesive mixed with the lignocellulosic particles may vary depending, for example, upon the desired composite type, lignocellulosic material type and amount and particular adhesive composition. In general, about 1 to about 12, more particularly about 3 to about 10, weight percent adhesive may be mixed with the lignocellulosic material, based on the total combined weight of adhesive and lignocellulosic material. The mixed adhesive composition may be added to the comminuted lignocellulosic particles by spraying or similar techniques while the lignocellulosic particles are tumbled or agitated in a blender or similar mixer. For example, a stream of the comminuted lignocellulosic particles may be intermixed with a stream of the mixed adhesive composition and then be subjected to mechanical agitation.

The adhesive compositions also may be used to produce plywood or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

The presently disclosed adhesives provide a strong bond between the lignocellulosic particles or fractions. The adhesives also provide structural composites with high mechanical strength. In addition, the adhesive compositions are substantially free of formaldehyde (including any compounds that may degenerate to form formaldehyde). For example, the adhesive compositions do not contain any formaldehyde (and formaldehyde-generating compounds) that is delectable by conventional methods or, alternatively, the amount of formaldehyde (and formaldehyde-generating compounds) is negligible from an environmental and workplace regulatory standpoint.

The specific examples described below are for illustrative purposes and should not be considered as limiting the scope of the appended claims.

Example 1

Preparation of Alkali-Modified Soy Protein Isolate

SPI powder (30 g) was mixed with 400 ml of distilled water at room temperature and then stirred for 120 minutes. The pH value of the mixture was then adjusted to 10 using sodium hydroxide (1 M). The mixture was subsequently mixed in a shaker at 50° C. and 180 rpm for 120 minutes. The mixture was then concentrated to ⅔ of the original volume via membrane concentration (membrane had a 10 kDa molecular weight restriction), and freeze-dried.

Example 2

Preparation of Wood Protein Adhesive Mixture

The alkali-modified SPI from Example 1 (5 g) was added to 30 ml of an aminopolyamide-epichlorohydrin resin (Kymene® 557H available from Hercules Inc.) and then stirred at room temperature. The resulting aqueous solution was used as an adhesive for maple veneers as described below.

Example 3

Preparation And Testing Wood Composites

Adhesive mixtures prepared as described in Example 2, Kymene® 557H resin alone, and a phenol-formaldehyde (PF) adhesive mix commercially available from Georgia-Pacific were evaluated for their ability to bond together two pieces of maple veneer. The bonding area was 1 cm². The adhesive preparation for testing was applied to one side and the end of a maple veneer strip (1 cm×10 cm). Two pieces of maple veneer strips were stacked together and hot-pressed at 250° F. for 5 minutes. The applied pressure was 200 psi. The lap-shear strength was measured with an Instron machine.

Water resistance of the adhesive composition (for use in composites that might be exposed to water) was also tested. The wood composite specimens obtained as described above were soaked in water at room temperature for 48 hours and then dried at room temperature in a fume hood for 48 hours. Soaking and drying cycles were repeated three times and any delamination of the specimen (i.e., delamination without applying an external force) was recorded after each cycle. No delamination occurred with any of the specimens.

The lap-shear strength results are shown in FIG. 1. In all instances the SPI/Kymene® 557H adhesive provided greater lap-shear strength compared to the PF adhesive and to Kymene® 557H alone. Most surprisingly, no delamination was found on any of the SPI/Kymene® 557H-bonded composites and the adhesive strength did not decrease after the specimens were subjected to the water-soaking/drying test (the water resistance results shown in FIG. 1 are after one soaking/drying cycle). All the specimens bonded with the SPI/Kymene® 557H adhesive exhibited 100 percent wood failure rather than glue line failure, but specimens bonded with the PF adhesive or Kymene® 557H alone did not exhibit 100 percent wood failure. FIG. 1 also depicts the effect of the reaction time between Kymene® 557H and SPI (see the x-axis in the FIG. 1 graph) on the lap-shear strength. The reaction time is the time from initial mixing of the Kymene® 557H and SPI to the time the mixture was applied to the veneer. The lap-shear strengths at all tested times were higher than that of the PF adhesive. A mixture of Kymene® 557H and SPI that was not alkali modified (reaction time of 150 minutes) yielded a lap-shear strength of about 7.3 MPa. The data shown in FIG. 1 is the average of 13 individual specimens at each test point and the error bar represents the standard deviation.

In addition, the glue line for the SPI/Kymene® 557H adhesive is very light in color. In contrast, commercially available PF adhesives resulted in dark color glue lines that are problematic in the appearance of certain wood composite products.

Example 4

Preparation of Lignin Solution

Kraft lignin powder (20 g) was dissolved in 100 ml water and the pH value of the lignin solution was adjusted to 10.0~10.5 with 1N NaOH solution. The solids content of the lignin solution was measured as 17.0 percent. The lignin stock solution was used for preparing adhesives as described below.

Example 5

Effect of Mixing Time for Preparing Adhesives

A lignin stock solution (10 g, i.e., 1.7 g oven-dry solids) prepared according to Example 4 was mixed with Kymene® 557H (2.72 g, i.e., 0.34 g oven-dry solids) for various times ranging from 10 to 180 minutes. The resulting adhesive had a 16 weight percent solids content. The adhesive at each mixing time was brushed onto the ends of two maple veneer strips (7.6×17.8 cm) with the grain of the strips being parallel to the longitudinal direction. The brushed area on each veneer was 1×17.8 cm. The two adhesive-coated veneer strips were lapped together and hot-pressed at 277 psi and 120° C. for 5 minutes. The resulting two-ply wood composite panels were stored overnight at room temperature before the evaluation of their shear strength.

The dry shear strength was determined by cutting each two-ply wood composite panels into six specimens with each specimen having a bonding area of 1×2.54 cm. The shear strength was measured by an Instron machine at 1 mm/minute of crosshead speed. The maximum shear strength at breakage between two pieces of maple veneer strips was recorded as dry shear strength.

Figure 2:
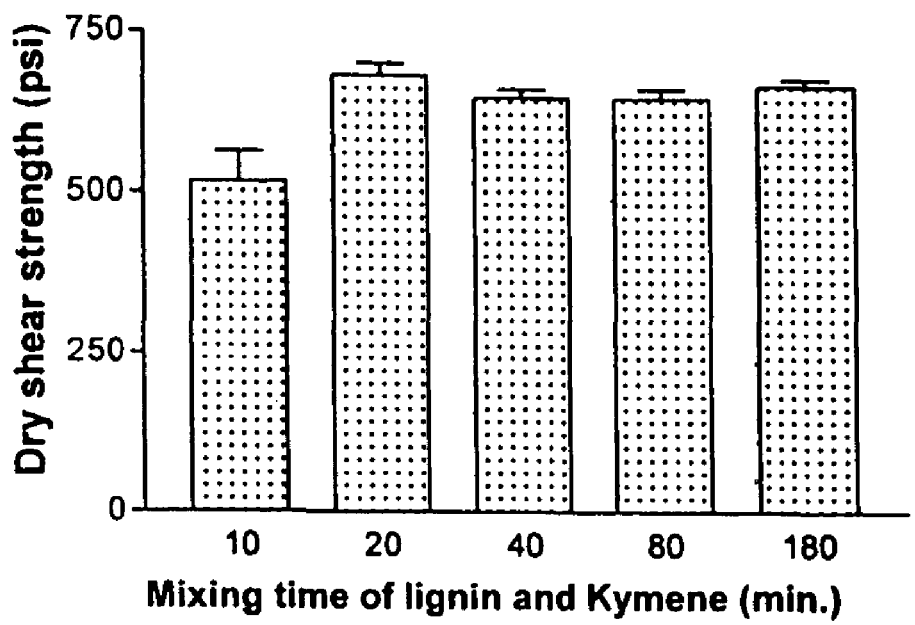
FIGS. 2-7 are graphs depicting the shear strengths of examples of the presently described adhesive compositions.

The results are shown in FIG. 2. Data are the mean of six replicates and the error bar represents one standard deviation.

Example 6

Effect of Hot Press Conditions on Shear Strength

A lignin stock solution (10 g, 1.7 g oven-dry solids) prepared according to Example 4 was mixed with Kymene® 557H (2.72 g, i.e., 0.34 g oven-dry solids) for 25 minutes. The resulting adhesive was applied to two pieces of veneer strips as described in Example 5. For determination of the effects of hot-press time on shear strength, the two adhesive-coated veneer strips were lapped together and hot-pressed at 277 psi and 120° C. for various times, ranging from 1 to 9 minutes.

For determination of the effects of hot-press temperature on shear strength, the two adhesive-coated veneer strips were lapped together and hot-pressed at 277 psi for 5 minutes at 100° C., 120° C., 140° C., and 160° C., respectively. The resulting two-ply wood composite panels were stored overnight at room temperature before the evaluation of shear strength.

Figure 3:
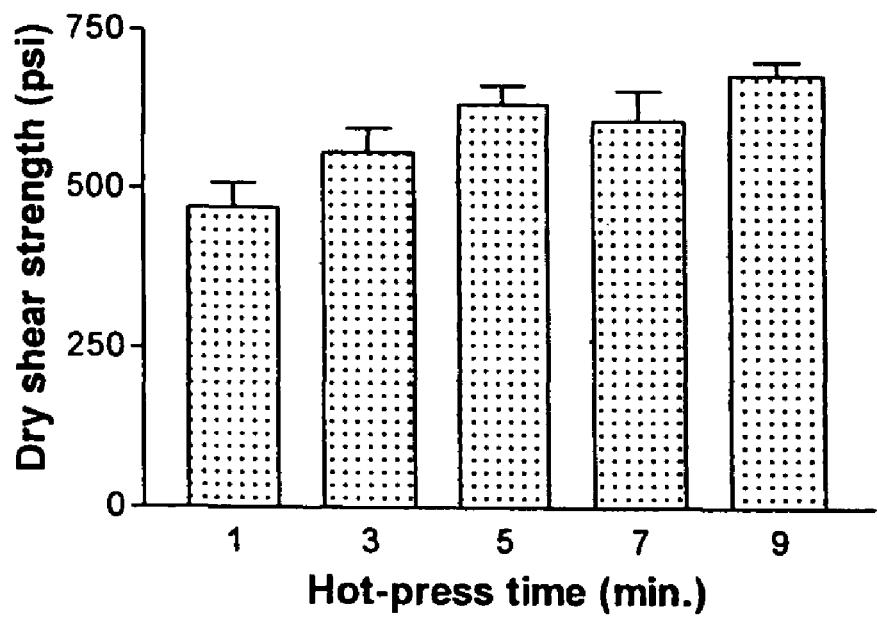
Figure 4:
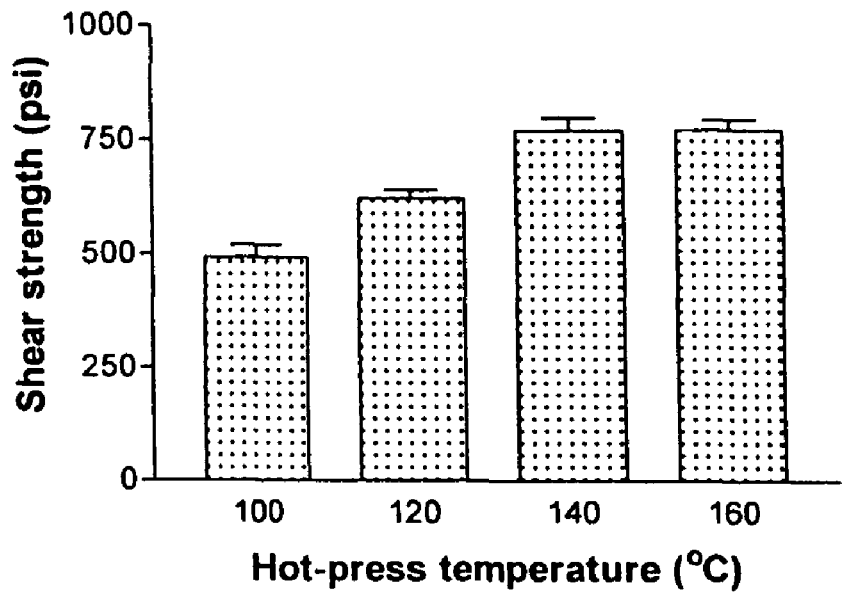

The dry shear strength results are shown in FIGS. 3 and 4. Data are the mean of six replicates and the error bar represents one standard deviation. When the hot-press time increased from 1 minute to 5 minutes, the shear strength of the wood composites also increased (FIG. 3). Further extension of hot-press time from 5 minutes to 9 minutes did not result in significant increases in shear strength. The shear strength significantly increased when the hot-press temperature increased from 100° C. to 140° C. (FIG. 4). However, no further increase of the shear strength was found when the temperature increased from 140° C. to 160° C.

Example 7

Effect of Weight Ratio of Lignin to Curing Agent

A lignin stock solution (10 g, i.e., 1.7 g oven-dry solids) prepared according to Example 4 was separately mixed with Kymene® 557H for 25 minutes with a weight ratio of lignin to Kymene® 557H ranging from 1:1 to 9:1. The total solids content of the resulting adhesives was kept at 16 percent. Each adhesive was brushed on two pieces of veneer strips as described in Example 5. The two adhesive-coated veneer strips were lapped together and hot-pressed at 277 psi and 140° C. for 5 minutes. Four two-ply wood composite panels were prepared with each adhesive. All two-ply wood composite panels were stored overnight at room temperature before the evaluation of their dry shear strength and water resistance.

The two-ply wood composite specimens bonded with the adhesives were subjected to a water-soaking-and-drying (WSAD) test and a boiling-water test (BWT). For a WSAD test, the specimens were soaked in water at room temperature for 24 hours, dried in a fume hood at room temperature for 24 hours, and then evaluated for the shear strength. A BWT was performed according to the U.S. Voluntary Product Standard PS 1-95 for Construction and Industrial Plywood (published by the U.S. Department of Commerce through APA—The Engineered Wood Association, Tacoma, Wash.). The specimens were boiled in water for 4 hours, dried for 24 hours at 63±3° C., boiled in water again for 4 hours, and then cooled down with tap water. While the specimens were still wet, shear strength was evaluated and defined as BWT/wet strength. Shear strength was also measured after the specimens had been dried at room temperature in a fume hood for 24 hours and this strength was defined as BWT/dry strength.

Figure 5:
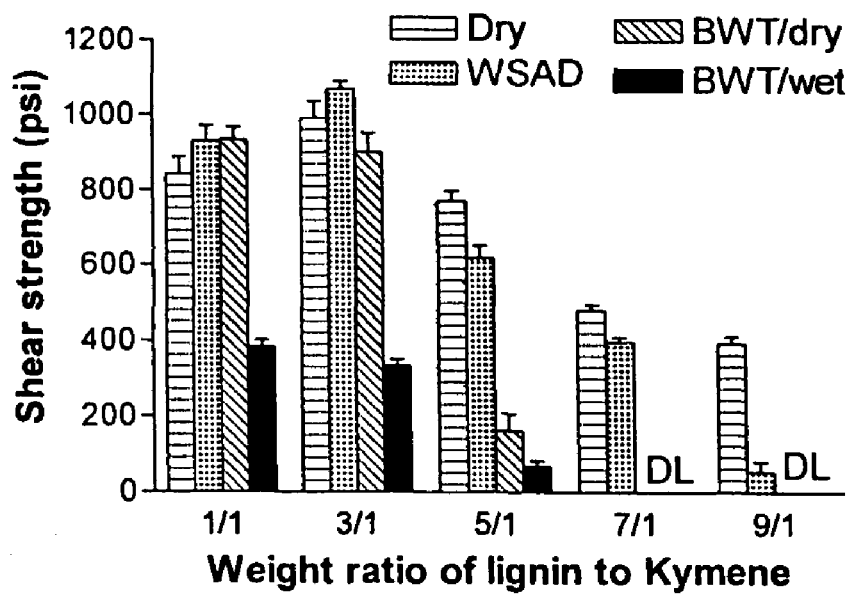

The 3:1 weight ratio of lignin to curing agent resulted in the highest dry shear strength and the highest shear strength after the wood composites underwent a WSAD cycle (FIG. 5). The BWT/dry shear strength at the 3:1 weight ratio was comparable to that at the 1:1 weight ratio. The BWT/wet shear strength at the 3:1 ratio was slightly lower than that at the 1:1 weight ratio. When the weight ratio of lignin to curing agent increased from 3:1 to 5:1, all corresponding shear strengths decreased (FIG. 5). The wood composites bonded with adhesives delaminated during a BWT when the weight ratio of lignin to curing agent was 7:1 or higher.

Example 8

Effect of Total Solids Content

Figure 6:
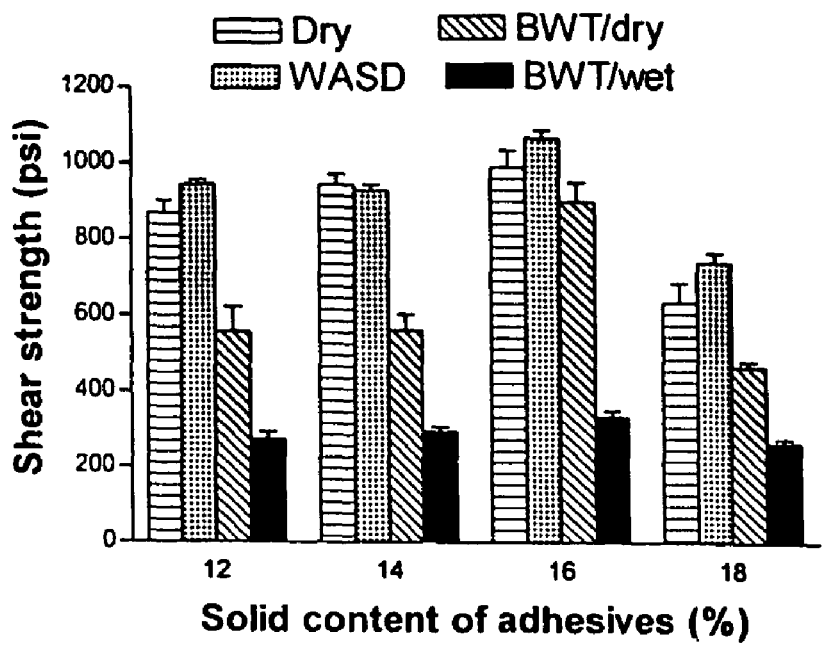

The lignin stock solution prepared according to Example 4 was first concentrated to 21.8% total solids content. The concentrated lignin stock solution (5 g, i.e., 1.09 g oven-dry solids) was diluted with de-ionized water of 4.23 g, 2.48 g, 1.18 g, and 0.17 g for 12 percent, 14 percent, 16 percent, and 18 percent total solids content, respectively. Each diluted lignin solution was mixed with Kymene® 557H (2.91 g, i.e., 0.36 g oven-dry solids) for 25 minutes. Each adhesive was brushed onto the end of two veneer strips as described in Example 5. The two adhesive-coated veneer-strips were lapped together and hot-pressed at 277 psi and 140° C. for 5 minutes. Four two-ply wood composite panels were prepared with each adhesive. All two-ply wood composite panels were stored overnight at room temperature before the evaluation of their shear strength and water resistance. The results are shown in FIG. 6.

The dry shear strength and water resistance of wood composites bonded with the adhesive at 12 percent total solids content were comparable to those at 14 percent total solids content. When the total solids content increased from 14 percent to 16 percent, all shear strengths (dry shear strength, WSAD shear strength, BWT/dry shear strength, and BWT/wet shear strength) increased. However, upon a further increase in the total solids content from 16 percent to 18 percent, all shear strengths decreased.

Example 9

Effect of Storage Time

Figure 7:
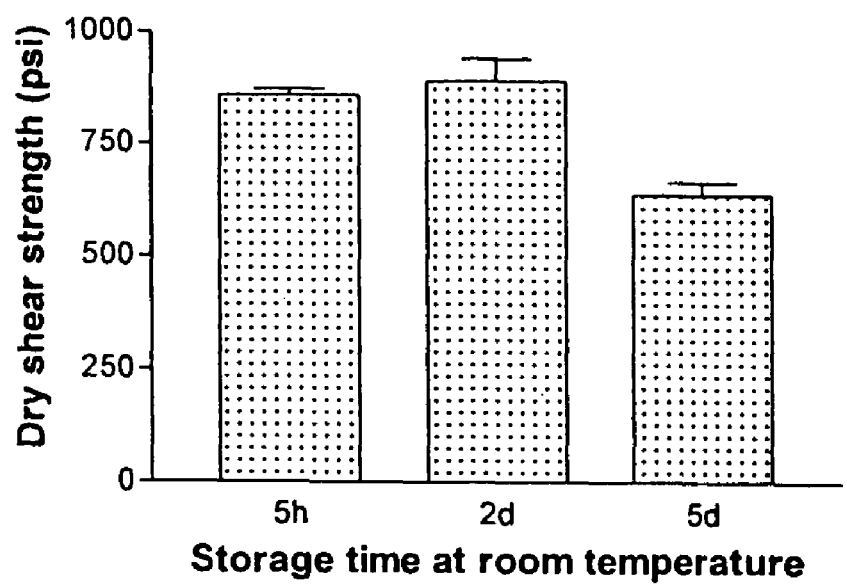

As shown in FIG. 7, the storage of a lignin/Kymene® 557H adhesive at room temperature for up to two days had little effect on the dry shear strength. However, the storage of the adhesive for five days, as compared for 2 days, decreased the dry shear strength.

Having illustrated and described the principles of the disclosed methods, compositions and composites with reference to several embodiments, it should be apparent that these methods, compositions and composites may be modified in arrangement and detail without departing from such principles.

What is claimed is:

1. A substantially formaldehyde-free adhesive composition comprising a reaction product of:
   soy flour; and
   at least one resin comprising an adduct of epichlorohydrin with a polyamidoamine resin.

2. The adhesive composition of claim 1, further comprising wheat flour.

3. A substantially formaldehyde-free adhesive composition, wherein the composition is made from the following ingredients:
   soy flour; and
   at least one resin comprising an adduct of epichlorohydrin with a polyamidoamine resin.

4. The adhesive composition of claim 3, further comprising wheat flour.

5. The adhesive composition of claim 1, wherein the adduct is a reaction product of poly(adipic acid-co-diethylenetriamine) and epichlorohydrin.

6. The adhesive composition of claim 3, wherein the adduct is a reaction product of poly(adipic acid-co-diethylenetriamine) and epichlorohydrin.

7. The adhesive composition of claim 1, wherein the adduct includes a nitrogen-containing, 4-member ring, functional group represented by:

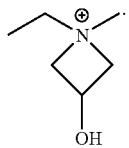

8. The adhesive composition of claim 3, wherein the adduct includes a nitrogen-containing, 4-member ring, functional group represented by:

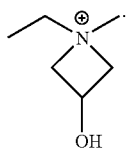

9. The adhesive composition of claim 1, wherein the adhesive composition comprises an aqueous solution of the reaction product.

10. The adhesive composition of claim 3, wherein the adhesive composition comprises an aqueous solution of the reaction product.

11. The adhesive composition of claim 3, wherein the adhesive composition is prepared by mixing an aqueous soy flour solution with an aqueous solution of the adduct.

12. The adhesive composition of claim 11, wherein the mix ratio of soy flour to the adduct is about 1:1 to about 1:0.05, based on dry weight.

13. The adhesive composition of claim 3, wherein the soy flour is mixed with the adduct, and the mix ratio of soy flour to the adduct is 1:1 to 1000:1.

14. The adhesive composition of claim 3, wherein the soy flour is mixed with the adduct, and the mix ratio of soy flour to the adduct is 1:1 to 100:1.

15. The adhesive composition of claim 3, wherein the soy flour is mixed with the adduct, and the mix ratio of soy flour to the adduct is 1.33:1 to 100:1.

16. The adhesive composition of claim 1, wherein the adhesive composition has a solids content of about 20 to about 60 weight percent.

17. The adhesive composition of claim 3, wherein the soy flour is mixed with the adduct, and the resulting mixture has a solids content of about 20 to about 60 weight percent.

18. The adhesive composition of claim 14, wherein the resulting mixture has a solids content of about 20 to about 60 weight percent.

19. The adhesive composition of claim 5, wherein the adhesive composition has a solids content of about 20 to about 60 weight percent.

20. A substantially formaldehyde-free composition, comprising a mixture of at least:
    (a) soy flour;
    (b) at least one resin comprising an adduct of epichlorohydrin with a polyamidoamine resin; and
    (c) comminuted lignocellulosic particles,
    wherein the soy flour and the resin form an adhesive that binds the comminuted lignocellulosic particles into a densified mass.

21. The composition of claim 20, wherein components (a) and (b) are pre-mixed prior to mixing with component (c).

22. The composition of claim 20, wherein the adduct is a reaction product of poly(adipic acid-co-diethylenetriamine) and epichlorohydrin.

23. The composition of claim 20, wherein the comminuted lignocellulosic particles are in a form of chips, flakes, fibers, strands, wafers, trim, shavings, sawdust, straw, stalks or shives.

24. The composition of claim 20, wherein the comminuted lignocellulosic particles are in a form of chips, flakes, wafers, trim, shavings, sawdust, straw, stalks or shives.

* * * * *